United States Patent
Li et al.

(10) Patent No.: US 9,828,247 B2
(45) Date of Patent: Nov. 28, 2017

(54) PROCESS AND APPARATUS FOR CLEANING RAW PRODUCT GAS

(71) Applicant: Renergi Pty Ltd, Subiaco, Western Australia (AU)

(72) Inventors: Chun-Zhu Li, Cottesloe (AU); Richard Gunawan, East Victoria Park (AU); Li Dong, Willetton (AU)

(73) Assignee: RENERGI PTY LTD, Subiaco, Western Australia (AU)

( * ) Notice: Subject to any disclaimer, the term of this patent is extended or adjusted under 35 U.S.C. 154(b) by 0 days.

(21) Appl. No.: 15/102,728

(22) PCT Filed: Dec. 16, 2014

(86) PCT No.: PCT/AU2014/001135
§ 371 (c)(1),
(2) Date: Jun. 8, 2016

(87) PCT Pub. No.: WO2015/089554
PCT Pub. Date: Jun. 25, 2015

(65) Prior Publication Data
US 2016/0304345 A1    Oct. 20, 2016

(30) Foreign Application Priority Data
Dec. 16, 2013 (AU) ............................... 2013904914

(51) Int. Cl.
*B01D 53/02* (2006.01)
*C01B 3/58* (2006.01)
(Continued)

(52) U.S. Cl.
CPC ............... *C01B 3/58* (2013.01); *B01D 53/04* (2013.01); *C01B 3/56* (2013.01); *C10J 3/06* (2013.01);
(Continued)

(58) Field of Classification Search
None
See application file for complete search history.

(56) References Cited

U.S. PATENT DOCUMENTS 3,981,355 A * 9/1976 Squires .................. B01J 8/0285
165/104.16
4,198,212 A * 4/1980 Tsao ........................ C10B 49/10
122/5
(Continued)

FOREIGN PATENT DOCUMENTS

CN   1233643   11/1999
CN   1539544   10/2004
(Continued)

OTHER PUBLICATIONS

International Search report dated Feb. 27, 2015 out of priority Application No. PCT/AU2014/001135 (3 pages).
(Continued)

*Primary Examiner* — Anita Nassiri Motlagh
(74) *Attorney, Agent, or Firm* — Brinks Gilson & Lione; G. Peter Nichols (57) ABSTRACT

The present disclosure provides a process for cleaning raw product gas. The process includes contacting the raw product gas with a flow of catalyst to reform organic contaminants and inorganic contaminants in the raw product gas and to remove particulates. Further, the process includes cooling the resulting product gas via heat exchange with a heat exchange medium in the presence of char or a solid adsorbent medium to condense remaining organic contaminants and inorganic contaminants on the char or solid adsorbent medium and to filter out fine particulates.

17 Claims, 4 Drawing Sheets

(51) Int. Cl.
*C01B 3/56* (2006.01)
*C10K 1/04* (2006.01)
*C10K 1/32* (2006.01)
*C10J 3/06* (2006.01)
*B01D 53/04* (2006.01)
*C10J 3/58* (2006.01)
*C10J 3/84* (2006.01)

(52) U.S. Cl.
CPC . *C10J 3/58* (2013.01); *C10J 3/84* (2013.01); *C10K 1/046* (2013.01); *C10K 1/32* (2013.01); B01D 2253/102 (2013.01); B01D 2255/20738 (2013.01); B01D 2255/20753 (2013.01); B01D 2257/304 (2013.01); B01D 2257/406 (2013.01); B01D 2257/408 (2013.01); B01D 2257/7027 (2013.01); C01B 2203/0227 (2013.01); C01B 2203/042 (2013.01); C01B 2203/048 (2013.01); C01B 2203/0435 (2013.01); C01B 2203/0465 (2013.01); C01B 2203/0883 (2013.01); C01B 2203/1047 (2013.01); C01B 2203/1058 (2013.01); C01B 2203/1082 (2013.01); C01B 2203/146 (2013.01); C10J 2300/093 (2013.01); C10J 2300/094 (2013.01); C10J 2300/0916 (2013.01); C10J 2300/1618 (2013.01); C10J 2300/1853 (2013.01); Y02P 20/13 (2015.11)

(56) References Cited

U.S. PATENT DOCUMENTS

| | | | |
|---|---|---|---|
| 4,412,848 A * | 11/1983 | Koyama | C10J 3/58 48/197 R |
| 6,015,450 A | 1/2000 | Joshi | |
| 6,178,899 B1 | 1/2001 | Kaneko | |
| 2011/0126460 A1 | 6/2011 | Bromberg | |
| 2011/0250661 A1 | 10/2011 | Sutradhar | |
| 2012/0193215 A1 * | 8/2012 | Fourcault | C01B 3/50 204/164 |
| 2013/0058856 A1 | 3/2013 | Yuan | |
| 2013/0153826 A1 * | 6/2013 | Paquet | C01B 3/02 252/373 |
| 2013/0185999 A1 * | 7/2013 | Chen | C10J 3/74 48/111 |
| 2013/0306913 A1 | 11/2013 | Li | |

FOREIGN PATENT DOCUMENTS

| | | |
|---|---|---|
| CN | 102350077 | 2/2012 |
| CN | 102939359 | 2/2013 |
| CN | 103119135 | 5/2013 |
| WO | WO 2010/138494 | 12/2010 |
| WO | WO 2013/049368 | 4/2013 |
| WO | WO 2013/151522 | 10/2013 |

OTHER PUBLICATIONS

Written Opinion dated Feb. 27, 2015 out of priority Application No. PCT/AU2014/001135 (3 pages).

First Office Action dated May 23, 2017 (23 pages including English translation) out of Chinese priority application 201480068560.9.

Dong, An advanced biomass gasification technology with integrated catalytic hot gas cleaning. Part I. Technology and initial experimental results in a lab-scale facility, Fuel, vol. 108, Jun. 2013, pp. 409-416.

* cited by examiner

PROCESS AND APPARATUS FOR CLEANING RAW PRODUCT GAS

This application claims priority to International Application No. PCT/AU2014/001135 filed Dec. 16, 2014 and to Australian Application No. 2013904914 filed Dec. 16, 2013: the entire contents of each are incorporated herein by reference.

FIELD OF THE INVENTION

A process and an apparatus for cleaning raw product gas are disclosed. Particularly, though not exclusively, a process and an apparatus are disclosed for cleaning a raw product gas produced by gasifying a carbonaceous material such as biomass and coal.

BACKGROUND OF THE INVENTION

Gasification refers to the conversion of a solid or liquid material, such as a carbonaceous material, into a gaseous fuel otherwise known as product gas. Gasification is of interest for many low-emission technologies in chemical and energy industries.

Gasification can be applied to a wide range of carbonaceous materials. In particular, low-rank carbonaceous fuels such as brown coal (lignite), peat, biomass and solid wastes are particularly suitable for gasification due to their high gasification reactivities. These low-rank fuels, however, are a complex mixture of organic and inorganic species and the resulting raw product gas is typically contaminated with tarry residues, fine particulates and alkali and alkaline earth metallic (AAEM) species as well as trace inorganics such as manganese, boron, copper, iron, molybdenum and zinc, and pollutant-forming species (e.g. $NH_3$, HCN, $NO_x$, $SO_x$ and $H_2S$). Tarry residues in the product gas tend to condense at lower temperatures in the downstream equipment, thereby causing operational difficulties. The inorganic species may also be volatilised into the product gas and cause serious problems for the operation of downstream equipment, including corrosion/erosion of turbine/engine components used for electricity generation.

Accordingly, it is generally necessary to clean the raw product gas before it can be used, for example, as a gaseous fuel in a turbine/engine or as a feedstock for chemical synthesis. The removal of various undesirable components such as tarry materials, AAEM vapour, particulates and $H_2S/NH_3/HCl/HCN$ from the gasification product gas contributes to the overall gasification process complexity and forms a significant component of the overall gasification capital and operating costs.

Scrubbing the raw product gas with a liquid, such as water or biodiesel, is a common practice to remove tarry residues and other undesirable species. However, the raw product gas must be cooled down first, causing some species to condense. It is also challenging to effectively recover heat from the raw product gas because of the unavoidable deposition of these species on the heat exchanger surface. Furthermore, the scrubbing operation merely transfers the tarry components and other undesirable species in the raw product gas into the water to create a liquid waste stream which requires expensive treatment prior to disposal. Many rural areas, where a biomass gasification system could be installed, for example, for distributed power generation, do not have a suitable source of water for the scrubbing operation. The use of other liquids such as biodiesel would be expensive, not only because of the purchasing cost but also because of the cost to transport the liquid to remote regions.

Many inorganic species in biomass are essential macro-nutrients (e.g. K, Mg and Ca) and micro-nutrients (e.g. manganese, boron, copper, iron, molybdenum and zinc) for the growth of biomass. The complex reactions involving these inorganic species during gasification may turn them into chemically very stable species such as silicates and consequently they become unusable or less suitable for the growth of new biomass even if the ash is returned back to the land. Alternatively, they may volatilise and end up as sludge (after the scrubbing operation) or reside in other forms of wastes which cannot be returned to the field. The loss of these nutrients from the land will deteriorate the long-term productivity and sustainability of agricultural land. In fact, it has been suggested that a significant fraction of biomass costs will be associated with additional costs to buy fertilisers to replenish the nutrients lost from the land due to the use of biomass as an energy source. Unfortunately, not all nutrients are replenished by these fertilisers. Therefore, there is a need to ensure that these nutrients can be retained during gasification in the forms that are accessible to the new biomass growth and returned back to the field. This is important for reducing the costs of biomass feedstock and ensuring the long-term sustainability of bioenergy as a green renewable energy source.

There is therefore a need for technological advancement.

Any references to background art do not constitute an admission that the art forms a part of the common general knowledge of a person of ordinary skill in the art. The above references are also not intended to limit the application of the apparatus and process as disclosed herein.

SUMMARY OF THE INVENTION

Generally, a process, an apparatus and a system for cleaning raw product gas are disclosed.

In accordance with one aspect of the present invention, there is provided a process for cleaning raw product gas, the process comprising:
 a) contacting the raw product gas with a flow of catalyst to reform organic contaminants and inorganic contaminants in the raw product gas and remove particulates; and
 b) cooling the resulting product gas via heat exchange with a heat exchange medium in the presence of char or a solid adsorbent medium to condense remaining organic contaminants and inorganic contaminants on said char or solid adsorbent medium and to filter out fine particulates.

In a one embodiment, the catalyst comprises char or char-supported catalyst and the method) may consequently comprise contacting the raw product gas with the flow of char or char-supported catalyst under operating conditions in which tarry residues in the raw product gas are reformed, at least in part, and the char or char-supported catalyst is gasified by the gasifying agents in the raw product gas such as $H_2O$ and $CO_2$. Some particulates may also be caught by the char or char-supported catalyst and may be removed from the product gas. It will be appreciated that the char or char-supported catalyst may be partially or completely gasified by the gasifying agents in the raw product gas.

In one embodiment of the invention, the raw product gas flows in a direction substantially perpendicular to the flow of char or char-supported catalyst. The relative flows of char or char-supported catalyst and raw product gas may be regulated to contact the raw product gas with the flow of char or char-supported catalyst for a defined period.

In another embodiment of the invention, the raw product gas has a high temperature of about 800° C. or more. It will be appreciated that the step of contacting the raw product gas with the flow of char or char-supported catalyst may reduce the temperature of the raw product gas to a temperature between about 700° C. and about 750° C., due mainly to the endothermic reactions between the product gas (especially $H_2O$ and $CO_2$ therein) and the char or char-supported catalyst.

In one embodiment of step b), cooling the resulting product gas via a heat exchange medium in the presence of char or a solid adsorbent medium comprises passing the product gas through a heat exchanger arranged to house a bed of char or the solid adsorbent medium. As the product gas passes through the bed of char or solid adsorbent medium, the tarry residues, other condensable organic and/or inorganic species remaining in said product gas condense on the surface of the char or the solid adsorbent medium. The fine particulates are also filtered out from the raw product gas. The sensible heat from said product gas is recovered by heat exchange with the heat exchange medium in the heat exchanger. The heated heat exchange medium may subsequently be used for process heating elsewhere in the plant. The heat exchange medium may be a gas or a liquid, such as air.

It should be appreciated that the heat transfer medium may also be the char or adsorbent or other solids. In this case, the cooling of the product gas comprises contacting said product gas with char or adsorbent.

In one embodiment of the invention, cooling the product gas reduces the temperature of the product gas to less than 250° C., such as less than 200° C.

In accordance with a second aspect of the present invention, there is provided an apparatus for cleaning raw product gas, the apparatus comprising:

a reaction zone arranged in fluid communication with a gasifier for producing a raw product gas, in use a flow of catalyst passing through at least a portion of the reaction zone and the reaction zone in use receiving the raw product gas from the gasifier which is contacted with the flow of catalyst; and a cooling zone in use housing a bed of char or adsorbent material, the cooling zone being configured in fluid communication with the reaction zone, wherein in use the raw product gas is received by, and cooled within, the cooling zone via heat exchange with a fluid heat exchange medium in the presence of char or a solid adsorbent medium.

The reaction zone may be provided with a raw product gas inlet arranged in fluid communication with the gasifier and a product gas outlet in fluid communication with the cooling zone. The reaction zone may also be provided with an inlet and an outlet for the flow of char or char-supported catalyst.

The reaction zone may be adapted to allow the raw product gas to flow in a direction substantially perpendicular to the flow of char or char-supported catalyst. In one example, the reaction zone may be adapted to allow the flow of char or char-supported catalyst in a vertical direction under gravity feed. In this particular example, the outlet for the flow of char or char-supported catalyst may be disposed in a lower portion of the reaction zone. The reaction zone may be further provided with a solid discharging device in the form of a locked hopper operatively connected to the outlet for the flow of spent char or char-supported catalyst.

The reaction zone may be adapted to regulate the relative flows of char or char-supported catalyst and raw product gas to contact the raw product gas with the flow of char or char-supported catalyst for a period of sufficient length to reform, at least in part, tarry residues in the raw product gas and to partially or completely gasify the char or char-supported catalyst. Some particulates are also removed simultaneously.

The cooling zone is provided with a heat exchanger arranged to house a bed of char or solid adsorbent medium, which may be a fixed bed or a moving bed. The cooling zone may further be provided with a product gas inlet arranged in fluid communication with the product gas outlet of the reaction zone and a clean product gas outlet. The cooling zone may also be provided with an inlet and an outlet for the operation of the moving bed of char or char-supported catalyst. The heat exchange medium may also be the char or solid adsorbent.

In one embodiment, the apparatus comprises a vessel having defined therein the reaction zone and the cooling zone.

In another embodiment, the apparatus comprises a first vessel having defined therein the reaction zone and a second vessel having defined therein the cooling zone.

The first vessel may be provided with a raw product gas inlet arranged in fluid communication with the gasifier and a product gas outlet in fluid communication with the second vessel. The first vessel may also be provided with an inlet and an outlet for the flow of char or char-supported catalyst.

The second vessel may be provided with a heat exchanger arranged to house a bed of char or solid adsorbent medium. The second vessel may further be provided with a product gas inlet arranged in fluid communication with the product gas outlet of the first and a clean product gas outlet. The second vessel may also be provided with an inlet and an outlet for the flow of char or char-supported catalyst.

The apparatus in accordance with an embodiment of the present invention may be readily integrated with a gasifier for gasification of carbonaceous material, in particular biomass, to clean raw product gas produced in the gasifier.

Accordingly, in another aspect of the invention there is a gasification system comprising a gasifier for gasifying carbonaceous material to produce a raw product gas and an apparatus for cleaning raw product gas as defined in the second aspect of the invention, said apparatus being arranged in fluid communication with the gasifier to receive and clean the raw product gas. The char or char-supported catalyst from either or both zones of said apparatus may also be fed back to the gasifier for complete gasification.

In one example the gasification system comprises a pyrolyser configured in fluid communication with, and upstream of, the gasifier in an arrangement whereby the gasifier receives pyrolysed carbonaceous material from the pyrolyser, the pyrolyser being arranged in fluid communication with said cooling zone of said apparatus to receive said fluid heat exchange medium to heat said carbonaceous material in the pyrolyser.

DESCRIPTION OF THE FIGURES

Notwithstanding any other forms which may fall within the scope of the apparatus and method as set forth in the Summary, specific embodiments will now be described, by way of example only, with reference to the accompanying drawings in which.

DETAILED DESCRIPTION OF SPECIFIC EMBODIMENTS

Embodiments of the present invention relate to a process for cleaning a raw product gas and an apparatus 10, 10' for cleaning a raw product gas as described with reference to FIGS. 1, 2a and 2b and 3.

In its broadest form, the process for cleaning a raw product gas comprises the steps of:
 a) contacting the raw product gas with a flow of catalyst; and
 b) cooling the resulting product gas via heat exchange with a heat exchange medium in the presence of char or a solid adsorbent medium.

The term 'raw product gas' is used herein to refer to a product gas produced by gasifying a carbonaceous material (gasification), in particular a low-rank carbonaceous material such as biomass, that contains contaminants such as tarry residues, condensable light organics, fine particulates, volatilised inorganic species inherent in the carbonaceous material and pollutant-forming species (e.g. $NH_3$, HCN, $NO_x$, $SO_x$, and $H_2S$) which form during gasification.

Gasification is the conversion of a solid or liquid carbonaceous material into a product gas (i.e. a mixture of carbon monoxide, hydrogen, light hydrocarbons and other gases including nitrogen and $CO_2$) and ash by reacting with air, oxygen, $CO_2$ and/or steam at high temperatures. Char is sometimes produced as a by-product.

The term 'carbonaceous material' is used broadly throughout this specification and includes, but is not limited to, coal such as anthracite, semi-anthracite, bituminous coal, sub-bituminous coal, brown coal (lignite) and peat, oil shale, petroleum coke, biomass, waste rubber including but not limited to vehicle tyres, waste plastic materials, agricultural waste, mixtures thereof and mixtures of said carbonaceous materials with other substances. The process and apparatus of the embodiments of present invention described with reference to FIGS. 1, 2a and 2b and 3 are particularly suitable for use with raw product gas produced from gasification of low-rank carbonaceous material having a high volatile matter yield and high contents of volatile inorganic species.

The process involves contacting the raw product gas with a flow of catalyst.

In one embodiment, the catalyst comprises char or a metal catalyst supported on a carbonaceous material substrate in the form of char or other carbonaceous materials. Other types of catalyst may also be used. The char or char-supported catalyst may be prepared from pyrolysis and/or partial gasification of a carbonaceous material or carbonaceous material containing or impregnated with catalytic species, in particular transition metals. Alternatively, the metal may be loaded/impregnated into the char following such methods commonly known to those skilled in the field. In one embodiment, the catalyst comprises Fe and/or Ni supported on char. Advantageously, the char produced from pyrolysis or gasification of biomass contains abundant inherent catalytic species, particularly AAEM species, that are well dispersed inside the char. Accordingly, the char produced from pyrolysis or gasification may be used for catalysing the decomposition of tar residues in the raw product gas.

In one embodiment, the flow of catalyst may be continuous.

The flow of catalyst may descend progressively through a reaction zone, in which reaction zone the raw product gas is contacted therewith. In one embodiment, the flow of char or char-supported catalyst may descend progressively through the reaction zone by gravity as a moving bed. In an alternative embodiment, the flow of char or char-supported catalyst may descend progressively through the reaction zone by a transfer means in the form of an auger, a screw or other modes known to those skilled in the field.

In one embodiment the raw product gas flows in a direction substantially perpendicular to the flow of char or char-supported catalyst. Advantageously, in this manner ash and/or char particles entrained in the raw product gas are transferred into and caught by the flow of char or char-supported catalyst.

Advantageously, a relatively low raw product gas flow will avoid entrainment of fine char/ash particles therein. The relative flows of char or char-supported catalyst and raw product gas may be regulated to contact the raw product gas with the flow of char or char-supported catalyst for a defined residence period in the reaction zone. This encourages the removal of particulates in the product gas by the flow of char or char-supported catalyst.

By contacting the raw product gas with the flow of char or char-supported catalyst tarry residues in the raw product gas are reformed by $H_2O$, $CO_2$ and/or other reforming agents present in the raw product gas to produce additional product gas comprising mainly $CO_x$ (where x is 1, 2) and $H_2$. These reforming reactions are catalyzed by the char or char-supported catalyst. Advantageously, pollutant-forming compounds such as HCN, $H_2S$ and $NH_3$ and pollutant compounds such as $NO_x$ and $SO_x$ in the product gas may be reduced to $N_2$ or fixed as metal sulphides in the residual char or catalyst. The high temperature of the product gas also satisfies the energy demands of endothermic volatile reforming reactions. Advantageously, therefore, part of the sensible heat of the raw product gas produced in the gasifier is recuperated into chemical energy in the form of additional product gas.

Contacting the raw product gas with the char or char-supported catalyst partially or completely gasifies the char or char-supported catalyst to produce additional product gas and ash. The ash (and partially gasified char), including those present in the raw product gas before entering the reaction zone and those produced in the reaction zone, may be discharged from the reaction zone by means of a solids discharging device in the form of a locked hopper or other suitable devices known to those skilled in the field. In this way, no additional solid or liquid waste streams arise from treating the contaminated product gas as described above.

Generally, the raw product gas exits a gasifier where it is produced at a relatively high temperature e.g. at or above 800° C. Regardless of its initial temperature, contacting the flow of char or char-supported catalyst reduces the temperature of the product gas to a temperature between about 700° C. to about 750° C. It will be appreciated that the temperature of the product gas will be reliant on the gasification reactivity of the char or char-supported catalyst. Advantageously, contacting the raw product gas with a flow of char or char-supported catalyst regulates the temperature of the raw product gas and will dampen any (e.g. accidental) temperature rise in the gasifier where the raw product gas is produced.

After contacting the raw product gas with a flow of char or char-supported catalyst, the process involves cooling the resulting product gas via heat transfer with a fluid heat exchange medium in the presence of char or a solid adsorbent medium. Generally, said product gas is cooled to less than 250° C., such as less than 200° C., as it passes.

The char may be of the same type as the char or char-supported catalyst employed in step a) of the process. Alternatively, any suitable adsorbent medium, either alone or in combination with char, may be employed in the cooling step. Examples of suitable adsorbent medium include, but are not limited to, activated carbon, alumina, silica or zeolites.

Although contacting the raw product gas with a flow of char or char-supported catalyst will remove organic contaminants, such as tarry residues, by virtue of reforming reactions, the resulting product gas may still contain some inorganic and organic contaminants. Subsequently cooling the product gas in the presence of char or a solid adsorbent medium removes organic and inorganic contaminants therefrom by condensing said organic and inorganic contaminants, such as volatilised AAEMs, and other inorganic/metallic species, on the surface of the char or adsorbent medium at an appropriate temperature. Entrained particulates in the product gas, such as sub-micron ash particles, are captured by the char or adsorbent medium. Other inorganic contaminants such as $NH_3$, $H_2S$ and other N-, Cl- or S-containing compounds are decomposed, absorbed or adsorbed through contact with the char or adsorbent medium. Advantageously, the AAEMs may enhance the reactivity of char. Accordingly, the process provides a means by which inorganic contaminants from raw product gas generated from low-rank carbonaceous materials may be conveniently utilized to enhance the capacity of spent char to be used as a fertilizer.

Residual organic contaminants in the product gas, including some types of tarry residues, in particular aromatic ring systems (e.g. naphthalene), may be resistant to catalytic reforming in the first step of the process. Cooling the product gas in the presence of char or a solid adsorbent medium causes these refractory organic residues to condense on the surface and/or in pores of the char or the adsorbent medium.

In one embodiment, cooling the resulting product gas comprises passing said product gas through a heat exchanger arranged to house a bed of char or the solid adsorbent medium. Condensation of organic and inorganic compounds occurs preferentially on the surface or in the pores of the char or solid adsorbent medium relative to the surface of the heat exchanger because of the greater surface area of the char (or solid adsorbent medium) and due to capillary action in the pores. Advantageously, the organic and inorganic contaminants condense at a much higher temperature into the pores of the char or the solid adsorbent medium than on the surface of the heat exchanger. Consequently, there is a reduction in foiling of the heat exchanger surface which is normally a notorious problem for heat exchangers employed to recover heat from raw product gas or other 'dirty' gas such as flue gas.

Sensible heat from said product gas is able to be recovered by heat exchange with the heat exchange medium in the heat exchanger. The heat exchange medium may be a gas or a liquid (including molten salts), such as air (for economic considerations). The resultant heated heat exchange medium may subsequently be used for process heating elsewhere in the plant, including drying biomass or other carbonaceous material, heating in the pyrolyser or gasifier, and so forth.

It will be appreciated that the char or the solid adsorbent medium may undergo periodic regeneration by desorbing the organic tarry materials and aromatics at increased temperatures. The abundant porous structure in the char or adsorbent means that a batch of char is likely to operate for a considerable period of time before it requires regeneration. The adsorbed inorganic contaminants are less likely to be removed by regeneration. Accordingly, the char will therefore need to be replaced from time to time, but generally only after a long period of operation. The spent char, after undergoing desorption to remove volatile organic contaminants, can then be returned into the field as a soil improver or fertilizer. Alternatively, the spent char may be gasified to recover its energy value.

Two embodiments of the apparatus 10, 10' for cleaning raw product gas will now be described with reference to FIGS. 1 and 2a, 2b as well as 3, respectively.

Figure 1:
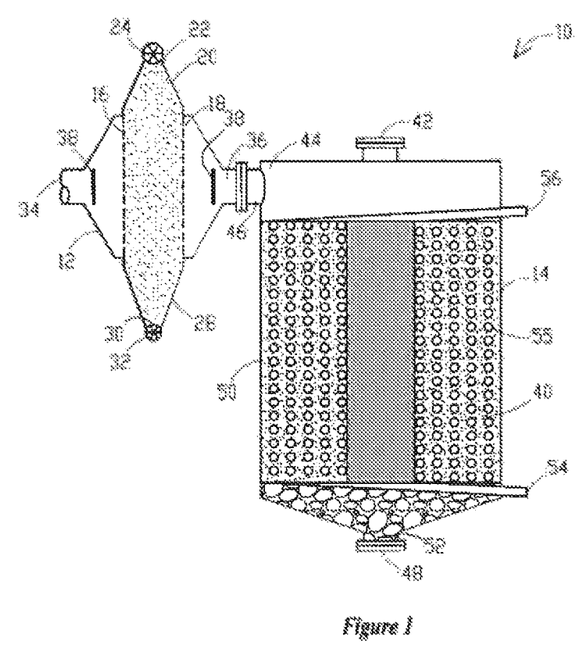
FIG. 1 is a schematic representation of an apparatus for cleaning raw product gas in accordance with the disclosure.

Referring to FIG. 1, the apparatus 10 includes a first vessel 12 having a reaction zone defined therein and a second vessel 14 having a cooling zone defined therein. The first vessel 12 is in fluid communication with the second vessel 14.

In this particular embodiment the reaction zone in the first vessel 12 is defined by a vertical-sided column formed by meshes 16 and 18. The meshes may also be perforated plates. In alternative embodiments, one of or both meshes (perforated plates) are absent and the whole vessel is the reaction zone.

Extending from an upper end of the column is an upper conical portion 20 which is provided with an inlet 22 for introducing a continuous flow of char or char-supported catalyst via a feeding device 24 from a hopper.

Extending from the lower end of the mesh column is a lower conical portion 28 which is provided with an outlet 30 for discharging ash and spent catalyst or a combination thereof by a discharger 32. The discharger 32 is in fluid communication with the outlet 30 of the lower conical portion 28, and may comprise a rotary valve or a similar device to minimize blockages and to control the flow rate of char or char-supported catalyst through the first vessel 12.

The first vessel 12 is provided with an inlet 34 for raw product gas arranged in fluid communication with a gasifier (not shown) and an outlet 36 in fluid communication with the second vessel 14 for withdrawing product gas treated in the reaction zone.

The inlet 34, and optionally the outlet 36, is provided with a guide unit 38 to direct the raw product gas to flow in a direction substantially perpendicular to the column. Advantageously, fine ash particles entrained in the raw product gas are captured by the flow of char or char-supported catalyst in the column.

It will be appreciated that the shape and size of the first vessel 12 will be adapted to provide a relatively large cross-sectional area to maximise gas-solid interactions and to capture the fine particulates in the raw product gas. Additionally, the raw product gas flow velocity is regulated to be relatively low to allow for sufficient residence time in the reaction zone.

In general, the second vessel 14 comprises a cylindrical vessel having an inwardly tapering base adapted to house a heat exchanger 55, such as in the form of a coiled heat exchanger, in a bed 40 of char or solid adsorbent medium. Other types of heat exchangers may also be used. It will be appreciated that the char or solid adsorbent medium is evenly interspersed and distributed amongst the coils of the coiled heat exchanger. A centrally disposed inlet 42 is provided at an upper end 44 of the second vessel 14 for loading and discharging the second vessel 14 with char or solid adsorbent medium. Other means of discharging the char or adsorbent medium known to those skilled in the field may also be used. Alternatively, the char or solid adsorbent medium may be discharged from an outlet (not shown) in the lower portion of the vessel 14.

The second vessel 14 is provided with an inlet 46 for product gas which has been treated in the first vessel 12 and an outlet 48 for withdrawing clean product gas. The inlet 46 is disposed in a side wall 50 of the second vessel 14, such as proximal to the upper end thereof, and is in fluid communication with the outlet 36 of the first vessel 12. The outlet 48 is provided in an apex 52 of the inwardly tapering base of the second vessel 14. Large solid particles may be packed in the apex to stop the char or solid adsorbent medium from escaping the vessel via the outlet 48.

The second vessel 14 is also provided with an inlet 54 in fluid communication with the coils of the heat exchanger 55 for receiving a heat exchange medium and an outlet 56 in fluid communication with the coils of the heat exchanger 55 for discharging a heated heat exchange medium.

In use, raw product gas from a gasifier, containing organic and inorganic contaminants as described above, is received in the inlet 34 of the first vessel 12 and is directed by guide unit 38 in a substantially perpendicular flow direction through a substantially vertical column between meshes 16 and 18 containing a descending flow of char or char-supported catalyst therethrough. The descending flow of char or char-supported catalyst is established by feeding char or char-supported catalyst into inlet 22 in the upper portion 20 of the mesh column 16 and discharging partially gasified char or char-supported catalyst, ash or a mixture thereof through outlet 30 in the lower portion 28 of the column by means of the discharging device 32.

The resulting product gas is then withdrawn from the first vessel 12 via outlet 36 and received into the second vessel 14 via inlet 46. Said product gas is passed through (outside of) the coiled heat exchanger 55 embedded in a bed 40 of char or solid adsorbent medium to progressively cool the resulting product gas from a temperature in a range of about 700° C. to about 750° C. to a temperature of less than 250° C., such as less than 200° C., at the outlet 48 of the second vessel 14. As the product gas cools, residual organic and inorganic contaminants in the product gas condense on or are caught by the char or the solid adsorbent medium and the sensible heat of the product gas is transferred to the heat exchange medium flowing through the coiled heat exchanger 55.

Figure 2A:
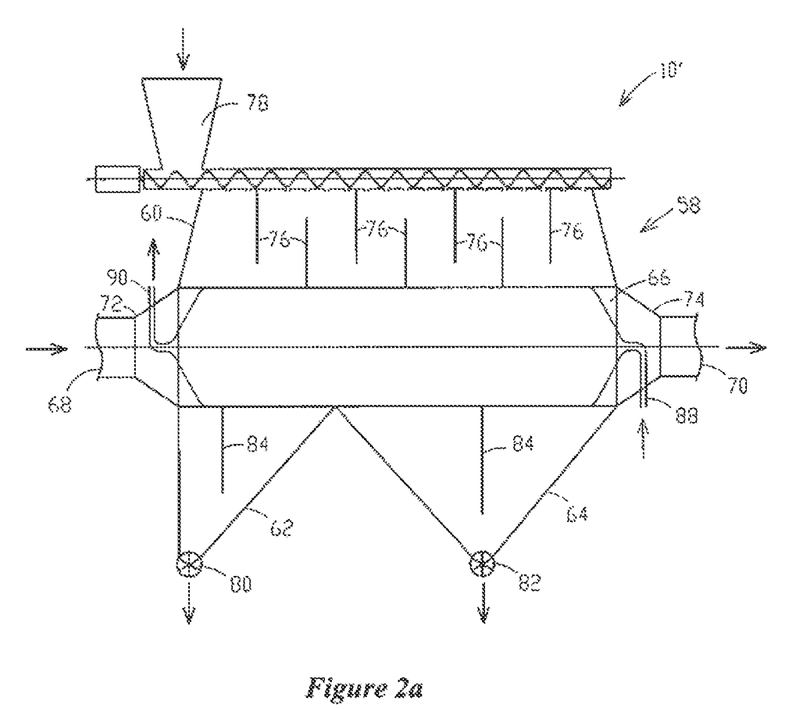
FIGS. 2a and 2b are front and plan views, respectively, of an alternative embodiment of an apparatus for cleaning raw product gas in accordance with the disclosure.
Figure 2B:
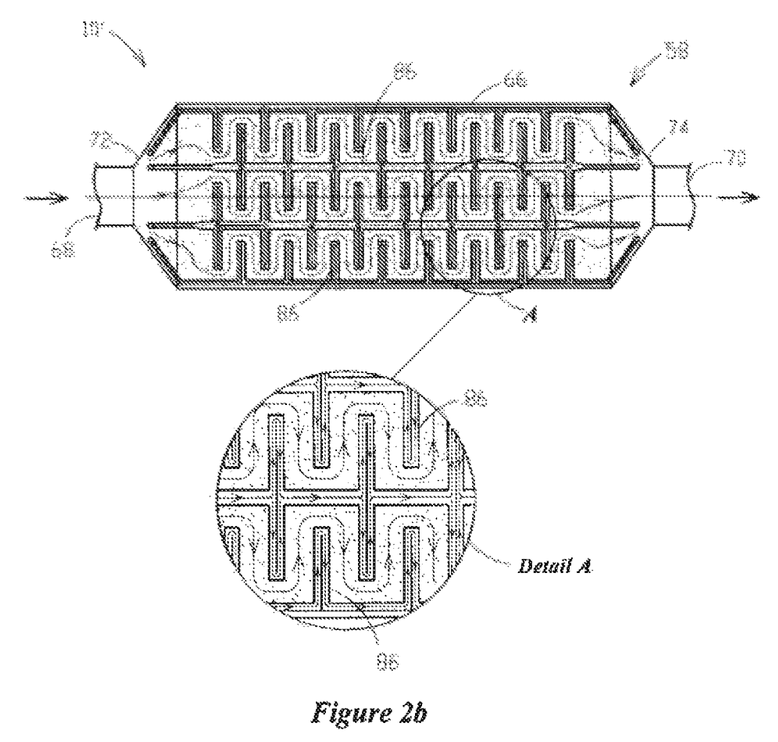

Referring to FIGS. 2a and 2b, the apparatus 10' includes a vessel 58 having defined therein a reaction zone and a cooling zone.

The vessel 58 has an upper portion 60, a first lower portion 62 spaced apart from a second lower portion 64, and an intermediate portion 66 substantially horizontally disposed along the length of the vessel 58 between the upper portion 60 and the first and second lower portions 62, 64. The vessel 58 is also provided with an inlet 68 for raw product gas arranged in fluid communication with a gasifier (not shown) and an outlet 70 for withdrawing product gas cleaned in the vessel 58. The inlet 68 and the outlet 70 are disposed in respective opposing ends 72, 74 of the intermediate portion 66. The vessel 58 is configured to constrain the raw product gas to flow in a general horizontal direction from the inlet 68 along the length of the intermediate portion 66 to the outlet 70.

The upper portion 60 of the vessel 58 defines a void provided with a plurality of baffles 76 configured to restrict gas flow in the upper portion 60. The upper portion 60 is also provided with a feeder 78 in the form of a grate feeder or 'leaking feeder' for feeding char into the vessel 58 as will be described later. In use, the void in the upper portion 60 is filled with char or char-supported catalyst or other types of catalysts or a mixture thereof.

The first and second lower portions 62, 64 are disposed proximal to respective opposing ends 72, 74 of the intermediate portion 66. The first and second lower portions 62, 64 are generally downwardly tapered to direct respective flows of gasified char, ash or a mixture thereof and spent char to discharge outlets 80, 82, as will be described later. Discharge outlets 80, 82 may be provided with any suitable discharging device such as a locked hopper. The first and second lower portions 62, 64 may also be provided with a plurality of baffles 84 configured to restrict gas flow therein.

The intermediate portion 66 is provided with a plurality of heat exchange plates or baffles 86 through which a heat exchange medium (e.g. air) flows. One or more inlets 88 for the heat exchange medium may be disposed proximal to the outlet 70 for the clean product gas. One or more outlets 90 for the heat exchange medium may be disposed proximal to the inlet 68 for the raw product gas. Consequently, this particular arrangement provides for counter-current flow of the heat exchange medium in respect to the flow of raw product gas. A co-current flow arrangement is also possible.

In this particular embodiment, the vessel 58 also houses a bed of char or char-supported catalyst interspersed between the heat exchange plates or baffles 86.

The heat exchange plates or baffles 86 (see Detail A) are configured to achieve high heat exchange surface areas. In FIG. 2, the heat exchange medium entering the vessel 58 via inlets 88 are divided into a plurality of substreams (4 substreams shown in the example in FIG. 2). Each substream of heat exchange medium passes through a series of spaced apart inter-connected parallel hollow plates. A baffle is provided within each hollow plate. The baffles and the walls of the hollow plates define a tortuous (U-shaped) passage to increase the heat transfer surface area and heat transfer coefficient to result in an enhanced heat transfer rate. Char or solid adsorbent particles fill the gaps among the hollow plates. The product gas flows through a passage of many turns as it flows through the bed of char or solid adsorbent medium. The hollow plates near the vessel wall are half in width of those inside. The vessel wall forms a part of the hollow plates.

In use, char, adsorbent or mixtures thereof, is fed into the vessel 58 via the feeder 78 into the upper portion 60 of the vessel 58 and descends under gravity into the intermediate portion 66.

The reaction zone of the vessel 58 is defined in an area at and proximal to the inlet 68 for receiving the hot raw product gas into the intermediate portion 66, where there is significant gasification/consumption of char and tarry residues and other organic contaminants are removed from the raw product gas by catalytic reforming reactions with the reforming agents (such as $H_2O$ and $CO_2$) in the product gas. Some inorganic contaminants such as $NH_3/H_2S/HCN/HCl$ and $SO_x/NO_x$ are also destructed or fixed into the char or catalyst. Particulates in the raw product gas are also at least partly caught by the flow of char or char-supported catalyst.

Ash, partially gasified char or a mixture of both slowly descends into the first lower portion 62 and is discharged through discharge outlet 80. The consumption of char in the intermediate portion 66 is compensated for (i.e. replenished) by a flow of char from the upper portion 60 of the vessel 58.

As the raw product gas passes through the heat exchange plates or baffles 86 of the intermediate portion 66 said gas progressively cools and gasification ceases. The cooling zone of the vessel 58 is thus defined as the portion of the intermediate portion 66 where the char generally adsorbs the condensed organic and inorganic contaminants from the raw product gas and filters out the fine particulates in the raw product gas. It will be appreciated that char is not substantially consumed in the cooling zone of the vessel 58 and therefore comprises a slow moving bed of char or char-supported catalyst. The spent char may be discharged slowly and continuously or intermittently from the discharge outlet 82 of the second lower portion 64 of the vessel 58. The spent char may be regenerated to re-volatilise the tarry residues and returned to the vessel 58. Alternatively, the spent char may be gasified to recover its energy values.

The regenerated spent char also contains abundant AAEM species and other inorganic nutrients, and can be readily returned to the soil as a soil improver. The recycling of the char in this manner has two important advantages: (1) the return of inorganic nutrients in the char to the field, and (2) carbon sequestration, hence reducing carbon emissions from such processes as fuel conversion and power generation. These factors are important for the sustainable development of rural and regional communities in the long term.

As described above in detail, embodiments of the present invention provide an efficient hot gas cleaning method, especially for the gasification of low-rank carbonaceous materials, to manufacture relatively high quality product gas for purposes such as electricity generation, heat production and chemical/fuel synthesis.

Embodiments of the present invention also provide solid catalysts capable of removing tar residues, particulates, other contaminants and pollutant-forming species from the product gas stream as well as capable of increasing the hydrogen content in the product gas.

It will also be appreciated that the sensible heat of the product gas may be efficiently used in an indirect heat exchanger with other process streams in the present invention prior to such streams being used in a gasification plant.

Alternatively, the sensible heat of the product gas may be used to dry or to pyrolyse the carbonaceous material prior to undergoing gasification.

Figure 3:
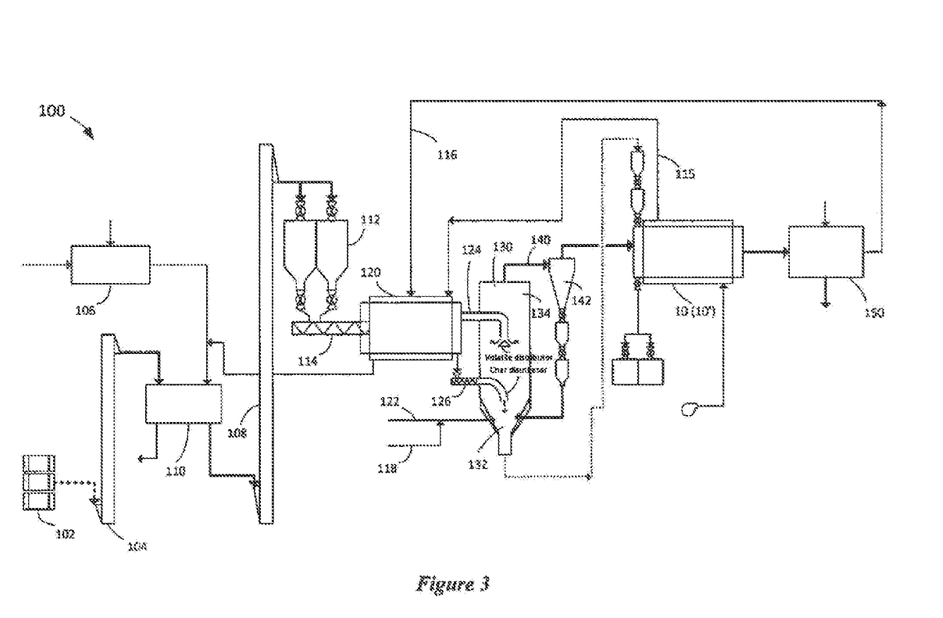
FIG. 3 is a schematic representation of a gasification system in accordance with the disclosure.

Referring to FIG. 3, there is shown one embodiment of a gasification system 100. The gasification system 100 includes a dryer 110 for drying carbonaceous material, such as biomass, a pyrolyser 120 for heating and pyrolysing the dried or partially dried carbonaceous material and producing char and volatiles, a gasifier 130 for gasifying the char and reforming the volatiles to produce a raw product gas, and the apparatus for cleaning raw product gas 10 or 10' as described previously. Said apparatus 10 or 10' is arranged in fluid communication with the gasifier 130 to receive and clean the raw product gas.

The gasification system 100 may be employed as described below.

Biomass (or an alternative carbonaceous material or a mixture thereof) is transferred from a storage hopper 102, for example, via a bucket elevator 104 which is arranged to feed biomass, to dryer 110. The dryer 110 employs a hot air stream to dry the biomass. The hot air stream may comprise waste heat streams derived from any one of the various components in the gasification system 100 (especially the exhaust of pyrolyser 120) or downstream equipment (e.g. the exhaust from gas engine). Alternatively, and in particular in start-up mode, the hot air stream may be derived from the combustor (e.g. of natural gas with air) in a direct air heater 106.

Dried or partially dried biomass exiting the dryer 110 is then transferred, for example, via bucket elevator 108 to parallel hoppers 112 (or other types of hoppers). A screw feeder 114 feeds dried biomass from the parallel hoppers 112 into the pyrolyser 120. Said screw feeder 114 is not always necessary because the pyrolser 10 may also act as a feeder. The pyrolyser 120 heats the dried biomass to produce volatiles (including water vapour) and solid char particles. The heat load for the pyrolyser 120 may be derived from a heated fluid heat exchange medium via conduit 115 used in the heat exchanger 55 (or 86) of the apparatus 10 (or 10') for cleaning raw product gas. Additionally, or alternatively, flue gas via conduit 116 from the gas engine 150 may deliver part or all of the heat load for the pyrolyser 120.

Steam and air are delivered to the gasifier 130 via lines 118 and 122. Volatiles and entrained fine particles from the pyrolyser 120 enter the gasifier 130 via conduit 124. Char particles exit the pyrolyser 120 and are fed into the gasifier 130 via screw feeder 126. The gasifier 130 may be provided with an auxiliary burner (not shown) which combusts natural gas or other fuels to provide additional heating load and/or in start-up mode.

In another embodiment, the pyrolyser 120 is integrated with the gasifier 130 into one vessel and the conduit 124 and the feeder 126 are no longer necessary. The pyrolysis products exit the pyrolyser and simultaneously enter the gasifier 130.

After entering gasifier 130, large char particles descend to a lower portion 132 of the gasifier 130 and the volatiles (and some entrained char fines) ascend to an upper portion 134 of the gasifier 130 where they undergo reforming reactions. The char particles react with an oxygen-containing gas stream, for example, in the form of air, diluted or pure oxygen, to produce mainly carbon monoxide (CO) and carbon dioxide ($CO_2$) together with other gases such as $H_2$ which subsequently ascend to the upper portion of the gasifier 130 and mix with the volatiles and reformed gas to produce a raw product gas. The separation of volatile reforming reactions and char gasification as described minimizes the adverse effects of volatile-char interactions, thereby accelerating the gasification of char. This arrangement also minimizes unnecessary contact of volatiles with the oxygen-containing gas to reduce consumption of the oxygen-containing gas.

In one embodiment, a conduit (not shown) connecting with feeder 126 is provided within the gasifier to bring the char particles close to the bottom portion of the gasifier. The lower portion of the gasifier is conically shaped so that the char particles are kept within the lower portion of the gasifier to ensure that they have sufficient lengths of residence time to react with oxygen and other gasifying agents. The conical angle can be calculated, using formulas known to those skilled in the field or using a computer software package (e.g. a computational fluid dynamics software package), from the terminal velocity of fine particles (i.e. avoidance of fine particle entrainment) by also considering that their residence time should be longer than the burnout time under the perceived conditions. The sizes of the fine particles to be retained in this region are chosen based on the particle size distribution of the char particles so that the majority of char particles are retained in the region for reaction with oxygen. While some large ash particles are discharged from the gasifier bottom, ash and unburned char fine particles will be entrained to the upper portion 134 of the gasifier and then transported into the cyclone for separation and collection.

To ensure proper ignition and light off of particles at the lower portion of the gasifier, the gasifying agents from 118 and 122 may be pre-heated prior to their entrance into the gasifier. One such way of pre-heating is to pass the gasifying agents through a heat exchanger e.g. a coiled heat exchange tube wrapped outside or inside the gasifier reactor wall. This heat exchange arrangement also contributes to the regulation of the temperature profile of the lower portion of the gasifier. Additionally, the introduction of steam into the lower portion is another way to regulate the reaction temperature at the low portion of gasifier.

Large char particles may be withdrawn from the lower portion 132 of the gasifier 130. The char may be employed in the apparatus 10 or 10' for cleaning raw product gas, in the reaction zone or the cooling zone, as has been described previously.

The raw product gas exits the gasifier 130 via conduit 140 and enters cyclone 142 where the raw product gas is separated from solid particulates, mainly char and ash.

The raw product gas then enters the apparatus 10 or 10' and is treated as previously described. The resulting cleaned product gas will then be used for various purposes such as power generation, hydrogen production and/or chemical/fuel synthesis.

In the embodiment shown in FIG. 3, the heated heat exchange medium from apparatus 10 or 10' is sent to the pyrolyser 120 to meet the energy demands to completely evaporate the residual moisture in biomass, to pyrolyse the biomass and to further crack the pyrolysis products to elevated temperatures. This is an effective way of energy recuperation.

Embodiments of the present invention could improve gasification efficiency. The technology can be suitably utilised in, for example, energy and chemical industries.

It will be readily apparent to a person skilled in the relevant art that some embodiments of the present invention may provide advantages over the prior art including, but not limited to, the following:

providing a raw product gas cleaning process, especially for raw product gas produced from low-rank carbonaceous materials, that sequentially reforms tarry residues at the higher exit temperatures of the gasifier, removes particulates, destroy pollutants or pollutant precursors and then condenses and adsorbs the remaining tarry and other organic residues and inorganics (e.g. AAEMs) on a bed of char or other solid adsorbent medium as the product gas is cooled, and that recovers thermal energy in the raw product gas;

minimising the amount of tar residues in the product gas, a problem which commonly arises in the gasification of low-rank carbonaceous materials, by reforming tar residues with char or a char-supported catalyst;

minimising the fine particulates in the product gas;

removing the volatilised AAEMs and pollutant-forming impurities such as $NH_3$, HCN and $H_2S$ with the bed of char or solid adsorbent medium;

the spent char or char-supported catalyst may be discharged, as a way of disposal, to the char gasification zone in a gasifier and gasified, thereby contributing to thermal energy production in the gasifier without generating an additional liquid or solid waste stream;

the spent char or char-supported catalyst contains abundant AAEM species and other inorganic nutrients and can be readily returned to the soil as a soil improver and for carbon sequestration;

the sensible heat of the raw product gas may be effectively converted (in part) into chemical energy and then further recovered by heat exchange with a heat exchange medium;

thermal heat recovery of the sensible heat of the raw product gas may be achieved without fouling the heat exchanger surfaces.

Numerous variations and modifications will suggest themselves to persons skilled in the relevant art, in addition to those already described, without departing from the basic inventive concepts. All such variations and modifications are to be considered within the scope of the present invention, the nature of which is to be determined from the foregoing description. For example, it is to be understood that embodiments of this invention are capable of being practiced and carried out in various ways at both small (a few megawatts or less) and large (a few hundred megawatts) scales.

It will be also understood that while the foregoing description refers to specific sequences of process steps, pieces of apparatus and equipment and their configuration are provided for illustrative purposes only and are not intended to limit the scope of the present invention in any way.

In the description of the invention, except where the context requires otherwise due to express language or necessary implication, the words "comprise" or variations such as "comprises" or "comprising" are used in an inclusive sense, i.e. to specify the presence of the stated features, but not to preclude the presence or addition of further features in various embodiments of the invention.

The invention claimed is:

1. A process for cleaning raw product gas, the process comprising:
   a) contacting the raw product gas exiting from a gasifier with a flow of catalyst to form a resulting product gas by reforming organic contaminants and inorganic contaminants in the raw product gas and by removing particulates from the raw product gas, wherein the raw product gas flows through the flow of catalyst in a substantially perpendicular direction; and
   b) cooling the resulting product gas via heat exchange with a fluid heat exchange medium in the presence of a bed of char or a solid adsorbent medium to condense remaining organic contaminants and inorganic contaminants on the char or solid adsorbent medium and to filter out fine particulates, as the product gas passes through the bed of char or solid adsorbent medium.

2. The process according to claim 1, wherein the catalyst comprises char or char-supported catalyst.

3. The process according to claim 2, wherein contacting the raw product gas with the flow of char or char-supported catalyst comprises contacting the raw product gas with the flow of char or char-supported catalyst under operating conditions whereby tarry residues and other contaminants in the raw product gas undergo reforming reactions and the char or char-supported catalyst undergoes partial or complete gasification.

4. The process according to claim 1, wherein the raw product gas has a relatively low flow velocity to enhance the removal of particulates by the flow of catalyst.

5. The process according to claim 4, wherein relative flows of catalyst and raw product gas are regulated to contact the raw product gas with the flow of catalyst for a defined period.

6. The process according to claim 1, wherein the cooling step b) comprises passing the resulting product gas through a heat exchanger arranged to house the bed of char or the solid adsorbent medium.

7. The process according to claim 6, wherein sensible heat from the resulting product gas is recovered by heat exchange with the heat exchange medium in the heat exchanger.

8. The process according to claim 7, wherein the heat exchange medium is selected from a gas or liquid molten salts.

9. An apparatus comprising:
a reaction zone arranged in fluid communication with a gasifier, wherein in use the reaction zone receives a raw product gas from the gasifier, in use a flow of catalyst passing through at least a portion of the reaction zone, wherein the reaction zone is adapted to allow the raw product gas to flow through the flow of catalyst in a substantially perpendicular direction; and
a cooling zone in use housing a bed of char or solid adsorbent material, the cooling zone being configured in fluid communication with the reaction zone, wherein in use the raw product gas is received by, and cooled within, the cooling zone via heat exchange with a fluid heat exchange medium in the presence of char or solid adsorbent medium as the product gas passes through the bed of char or solid adsorbent medium.

10. The apparatus according to claim 9, wherein the reaction zone is provided with an outlet for the flow of catalyst and the reaction zone is further provided with an ash discharging device operatively connected to the outlet for the flow of ash or spent catalyst.

11. The apparatus according to claim 9, wherein the reaction zone is adapted to regulate the relative flows of catalyst and raw product gas to contact the raw product gas with the flow of catalyst for a period of sufficient length to reform organic and inorganic contaminants in the raw product gas, to remove fine particulates in the product gas, and to partially or completely gasify the char or char-supported catalyst.

12. The apparatus according to claim 9, wherein the apparatus comprises a vessel having defined therein the reaction zone and the cooling zone.

13. The apparatus according to claim 9, wherein the apparatus comprises a first vessel having defined therein the reaction zone and a second vessel having defined therein the cooling zone.

14. The apparatus according to claim 9, wherein the cooling zone is provided with inlets and outlets for a fluid that is used to regenerate the char or solid adsorbent medium.

15. A gasification system for producing product gas from a carbonaceous material comprising:
a gasifier for gasifying carbonaceous material to produce a raw product gas;
and an apparatus for cleaning raw product gas as defined in claim 9, said apparatus being arranged in fluid communication with the gasifier to receive and clean the raw product gas.

16. The gasification system according to claim 15, wherein, the gasification system comprises a pyrolyser configured in fluid communication with, and upstream of, the gasifier in an arrangement whereby the gasifier receives pyrolysed carbonaceous material from the pyrolyser, the pyrolyser being arranged in fluid communication with said cooling zone of said apparatus to receive said fluid heat exchange medium to heat said carbonaceous material in said pyrolyser.

17. The gasification system according to claim 16, wherein the pyrolyser is integrated with the gasifier.

* * * * *